(12) United States Patent
Ulander (10) Patent No.: US 10,700,787 B1
(45) Date of Patent: *Jun. 30, 2020

(54) METHOD FOR TRACKING A SIGNAL SOURCE BASED ON POLARIZATION MODULATION

(71) Applicant: X Development LLC, Mountain View, CA (US)

(72) Inventor: Klaus Ulander, Livermore, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/570,425

(22) Filed: Sep. 13, 2019

Related U.S. Application Data

(63) Continuation of application No. 15/943,120, filed on Apr. 2, 2018, now Pat. No. 10,469,177.

(51) Int. Cl.
*H04B 10/532* (2013.01)
*H04B 10/112* (2013.01)

(52) U.S. Cl.
CPC ....... *H04B 10/532* (2013.01); *H04B 10/1123* (2013.01)

(58) Field of Classification Search
None
See application file for complete search history.

(56) References Cited

U.S. PATENT DOCUMENTS

| | | | |
|---|---|---|---|
| 5,307,194 A * | 4/1994 | Hatton | H04B 10/1121 250/504 R |
| 5,808,768 A | 9/1998 | Tadakuma et al. | |
| 6,490,067 B2 | 12/2002 | Bloom et al. | |
| 6,493,490 B1 * | 12/2002 | Steiger | G02B 6/422 356/400 |

(Continued)

FOREIGN PATENT DOCUMENTS

CN 102109330 A 6/2011

OTHER PUBLICATIONS

Abidin, Ul Zain, et al., "Circular Polarization Modulation for Digital Communication Systems,2012", Available online at: <https://pdfs.semanticscholar.org/09db/564930df1bfbcee27467aac93ea8727778b4.pdf>, Accessed on Feb. 4, 2018, 6 pages.

*Primary Examiner* — David W Lambert
(74) *Attorney, Agent, or Firm* — Botos Churchill IP Law LLP (57) ABSTRACT

The disclosure provides for a method and a system for tracking an optical communication beam based on polarization modulation of the optical communication beam. The method includes polarizing, at a first communication device, an optical communication beam in a polarization pattern. The optical communication beam carries an optical signal. The polarization pattern encodes information by varying between a first polarization direction and at least one second polarization direction. The polarized optical communication beam is then transmitted from the first communication (Continued)

device to a second communication device. At the second communication device, the polarized optical communication beam is processed to extract the encoded information, and the encoded information is used at the second communication device to track the optical communication beam.

20 Claims, 4 Drawing Sheets

(56) References Cited

U.S. PATENT DOCUMENTS

| | | | |
|---|---|---|---|
| 6,768,876 B1* | 7/2004 | Steiger | H04B 10/114 375/316 |
| 6,801,722 B1* | 10/2004 | Webb | H04B 10/1141 359/1 |
| 9,866,379 B2 | 1/2018 | Nordholt et al. | |
| 2011/0002695 A1 | 1/2011 | Choi et al. | |
| 2013/0083925 A1 | 4/2013 | Nordholt et al. | |
| 2014/0153923 A1* | 6/2014 | Casaccia | H04B 10/1149 398/58 |
| 2018/0240338 A1* | 8/2018 | Hue | B60Q 1/50 |

* cited by examiner

METHOD FOR TRACKING A SIGNAL SOURCE BASED ON POLARIZATION MODULATION

CROSS REFERENCE TO RELATED APPLICATIONS

The present application is a continuation of U.S. patent application Ser. No. 15/943,120, filed Apr. 2, 2018, the disclosure of which is hereby incorporated herein by reference.

BACKGROUND

Communication terminals may transmit and receive optical signals through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

BRIEF SUMMARY

Aspects of the disclosure provide for a method. The method includes using one or more processors of a first communication device to polarize an optical communication beam that carries an optical signal in a polarization pattern. The polarization pattern encodes information by varying between a first polarization direction and at least one second polarization direction. The method also includes using the one or more processors to transmit the polarized optical communication beam to a second communication device.

In one example, the method also includes establishing a communication link with the second communication device in accordance with a response to the encoded information. In yet another example, the method also includes receiving, by one or more second processors of the second communication device, the polarized optical communication beam; filtering, using a polarization filter for the first polarization direction, at least a portion of the polarized optical communication beam; receiving, at a tracking system of the second communication device, the filtered at least a portion of the polarized optical communication beam; determining, by the one or more second processors, an amplitude pattern of the filtered optical communication beam on the tracking system; extracting, by the one or more second processors, the encoded information from the optical communication beam based on the determined amplitude pattern; and tracking, by the one or more second processors, the optical communication beam based on encoded information.

The tracking system of the second communication device optionally includes a position sensitive detector. The method also optionally includes identifying, by the one or more second processors, the optical communication beam using the encoded information; determining, by the one or more second processors, a location of the filtered optical communication beam on the tracking system; determining, by the one or more second processors, an alignment of the first communication device with the second communication device based on the determined location and a target location of the tracking device; and adjusting, by the one or more second processors, the alignment of the second communication device with the first communication device based a difference between the determined location and the zero location. The tracking system includes a flat surface and the location of the filtered optical communication beam is on the flat surface of the tracking system.

Optionally, the method also includes establishing a communication link with the first communication device based on the encoded information. The method additionally or alternatively includes diverting the at least a portion of the optical communication beam towards the tracking system of the second communication device; and wherein a remaining portion of the optical communication beam is directed to an optical fiber of the second communication device. In a further example, the method includes filtering the at least a portion of the polarized optical communication beam by using the using the polarization filter to partially or totally block the at least a portion of the polarized optical communication beam when the polarization direction of the polarized optical communication beam is one of the at least one second polarization direction.

Other aspects of the disclosure provide for a system. The system includes one or more communication link transmitters configured to transmit an optical communication beam, a polarization controller, and one or more processors. The one or more processors are configured to polarize, using the polarization controller, an optical communication beam that carries an optical signal in a polarization pattern. The polarization pattern encodes information by varying between a first polarization direction and at least one second polarization direction. In addition, the one or more processors are configured to transmit, using the one or more communication link transmitters, the polarized optical communication beam.

In one example, the one or more processors are also configured to establish a communication link with a second communication device in accordance with a response to the encoded information. Optionally, the polarization controller is a piezomotor configured to apply stress on an optical fiber to cause the optical communication beam to be transmitted from the optical fiber to have a particular polarization direction.

Further aspects of the disclosure provide for a system. The system includes a polarization filter configured to filter polarization directions other than a first polarization direction, a tracking sensor configured to detect an optical communication beam, and one or more processors. The one or more processors are configured to receive an optical communication beam that has a plurality of polarization directions. The plurality of polarization directions includes the first polarization direction and at least one second polarization direction. In addition, the one or more processors are configured to filter, using the polarization filter, at least a portion of the optical communication beam and receive, at the tracking system, the filtered at least a portion of the optical communication beam. The one or more processors is then configured to determine an amplitude pattern of the filtered optical communication beam on the tracking system, extract the encoded information from the optical communication beam based on the determined amplitude pattern, and track the optical communication beam based on encoded information.

In one example, the tracking system is a position sensitive detector. In another example, the one or more processors are also configured to identify the optical communication beam using the encoded information, determine a location of the filtered optical communication beam on the tracking system, determine an alignment of the first communication device with the second communication device based on the determined location and a target location of the tracking device, and adjust the alignment of the second communication device with the first communication device based a difference between the determined location and the zero location. In this example, the tracking system optionally includes a flat surface and the location of the filtered optical communication beam is on the flat surface of the tracking system.

The one or more processors are additionally or alternatively configured to establish a communication link with the first communication device based on the encoded information. In a further example, the system also includes an optical fiber and a diverting component that is configured to divert the at least a portion of the optical communication beam towards the tracking system. In this example, a remaining portion of the optical communication beam is directed to an optical fiber. The diverting component in this example is optionally a lens system. In yet another example, the polarization filter is configured to partially or totally block light when a polarization direction of the light is different from the first polarization direction.

DETAILED DESCRIPTION

Overview

The technology relates to using polarization modulation of an optical communication beam to tracking the optical communication beam in place of a separate beacon beam in an FSOC system. Beacon signals can be used to identify a given communication link and track a beam position of the given communication link. Typically, beacon signals are transmitted in a dedicated channel separate from a communication link, and therefore cost bandwidth and power, as well as the additional hardware necessary to generate another wavelength of modulated light. To avoid this, an FSOC system may employ polarization modulation on an optical signal in place of a separate beacon signal.

For example, an optical communication beam may be transmitted from a first communication terminal to a second communication terminal. The optical communication beam may carry data in a communication signal. The transmitted optical communication beam may be polarized in a first pattern that encodes additional information, such as identifier information or other information that would typically be incorporated into a beacon signal. The optical communication beam may then be received at the second communication terminal where a portion of the optical communication beam is diverted towards a tracking sensor of the second communication terminal.

The diverted portion of the optical communication beam may be filtered using a polarization filter before it reaches the tracking sensor. The polarization filter may be configured to partially or totally block light that is not polarized in the particular polarization direction. As a result, the tracking sensor may receive the filtered optical communication beam in a second pattern related to the first pattern. The second pattern may be used to extract the encoded information, and, based on the extracted information, the second communication terminal may track the optical communication beam received from the first communication terminal.

The features described above may provide an optical communication system that more efficiently establishes and tracks communication links and utilizes power resources. Information may be transmitted in both the optical signal and in the polarization modulation of the optical signal simultaneously. The polarization modulation pattern may be provided continuously with the optical signal, unlike traditional beacon signals, which require a separate transmitter. The power and extra bandwidth of light that would be dedicated to providing a beacon signal may be removed or used for data transmission instead.

Example Systems

Figure 1A:
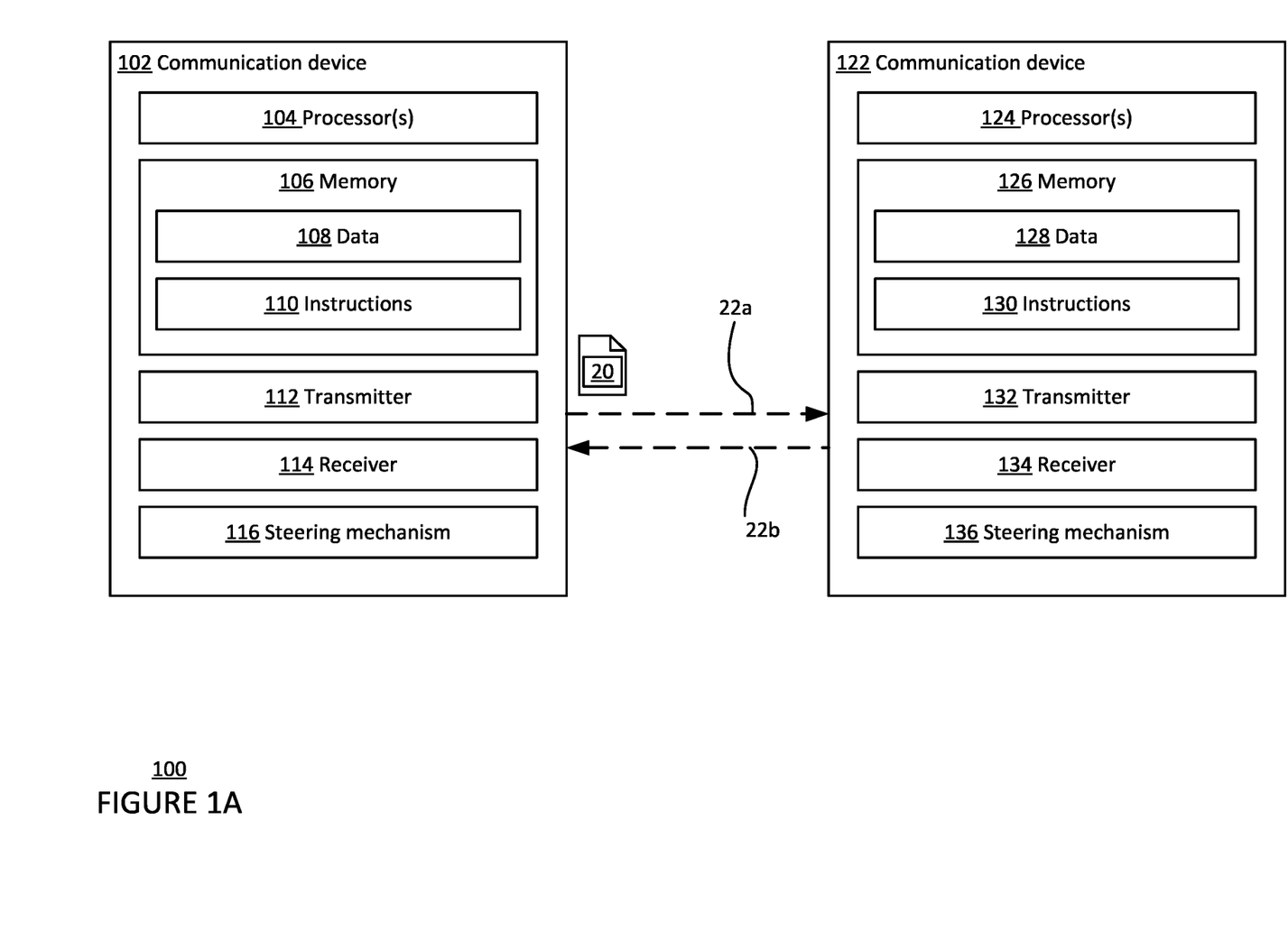
FIG. 1A is a functional diagram 100 of a first communication device and a second communication device in accordance with aspects of the disclosure.

FIG. 1A is a functional diagram 100 of a first communication device of a first communication terminal configured to form one or more links with a second communication device of a second communication terminal, for instance as part of a system such as a free-space optical communication (FSOC) system. For example, a first communication device 102 includes one or more processors 104, a memory 106, a transmitter 112, a receiver 114, and a steering mechanism 116.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, it will be understood that the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel. The one or more processors 104 may be used to collect and monitor state information of the first communication device 102. The state information may include, for example, a power level, pointing direction, geographic location, system requirements, or other type of information about the operation of the first communication device.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, the state information or updates to the state information collected by the one or more processors 104 may be stored.

Data 108 may be retrieved, stored or modified by the one or more processors 104 in accordance with the instructions 110. For instance, although the system and method is not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transmitter 112 and the receiver 114. Transmitter 112 and receiver 114 may be part of a transceiver arrangement in the communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

Figure 1B:
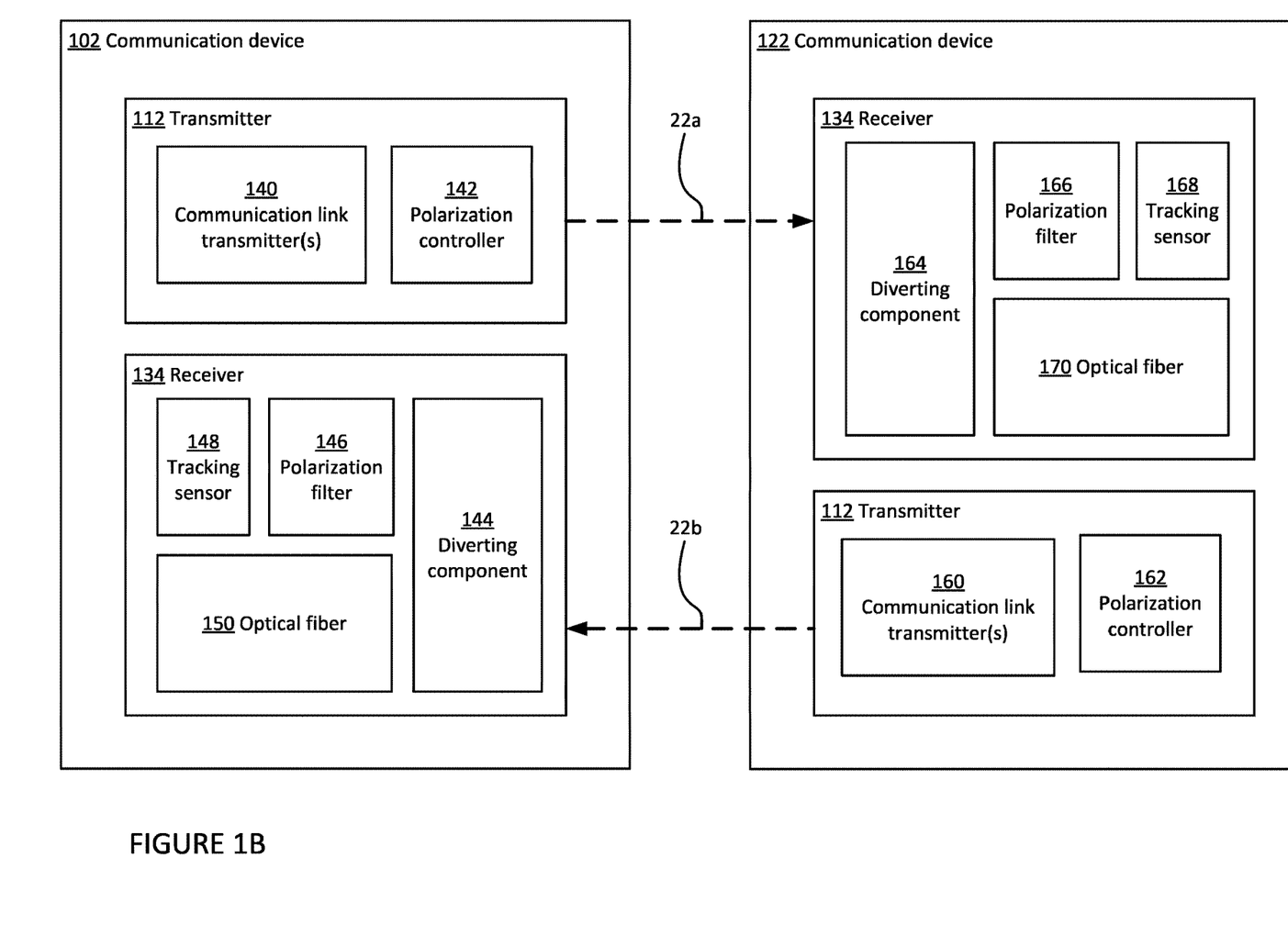
FIG. 1B is another functional diagram of a first communication device and a second communication device in accordance with aspects of the disclosure.

The transmitter 112 may be configured to transmit an optical communication signal 20 over a communication link 22 in the form of an optical communication beam. In some examples, the transmitter 112 may also be configured to transmit other signals that travel through free space, such as, for example, a radio-frequency signal. As shown in FIG. 1B, the transmitter 112 may include one or more communication link transmitters 140. In some implementations, a given communication link transmitter may include a semi-conductor device, such as, for example, a light-emitting diode (LED) or a laser diode. In some examples, the given communication link transmitter may include a fiber laser or a solid state laser. Laser diodes may be directly modulated, or in other words, the light output may be controlled by a current applied directly to the given communication link transmitter. The given communication link transmitter may include a single-mode laser diode that supports one optical mode, or the given communication link transmitter may include a multimode laser diode that supports multiple-transverse optical modes. The given communication link transmitter may receive a modulated communication signal from a modulator (not shown), which modulates a received electrical signal. The given communication link transmitter may then convert the modulated electrical signal into an optical communication beam in an optical fiber that is configured to establish a communication link with another communication device, and then output the optical communication beam from the first communication device 102 in free space. Using transmitter 112, the first communication device 102 may use the one or more communication link transmitters 140 to output an optical communication beam in a communication link 22a with the second communication device 122, which receives the optical communication beam.

The transmitter 112 may also be configured to polarize the optical communication beam in varying polarization directions over time. The pattern of the polarization directions may be a type of identifier of the optical communication signal 20 and/or the first communication terminal. For this purpose, the transmitter 112 may include a polarization controller 142 that is configured to control a polarization direction of a transmitted optical beam, as shown in FIG. 1B. The polarization controller 142 may be a piezomotor and, as an example, may be configured to apply stress on an optical fiber in order to cause an optical beam transmitted from the optical fiber to have a particular polarization direction. The polarization controller 142 may modulate the polarization direction of the signal over time. In some examples, the optical beam may be modulated to have the particular polarization direction at regular or irregular intervals.

The receiver 114 may include a tracking sensor configured to detect the optical beam and an optical fiber. In addition, the receiver 114 may also include a diverting component 144, such as a lens, mirror, or other system configured to divert a portion of a received optical beam to the tracking sensor and allow the remaining portion of the received optical beam to couple with an optical fiber 150. The tracking sensor may be a flat surface configured to detect a position of the optical beam on the flat surface. In some examples, the tracking sensor includes, but is not limited to, a position sensitive detector (PSD), a charge-coupled device (CCD) camera, a focal plane array, a photodetector, a quad-cell, or a CMOS sensor.

In addition, the receiver 114 may include a polarization filter 146 that is positioned between the tracking sensor 148 and the diverting component. The polarization filter may be configured to allow light from the optical beam that has one or more polarization directions through the filter and block or reduce all other light from the optical beam having different polarization directions. In particular, the polarization filter may be configured to allow light having a first polarization direction through at full or mostly full amplitude and to reduce the amplitude of light having other polarization directions different from the first polarization direction.

The tracking sensor may detect a signal location at the tracking sensor and may convert the received optical beam into an electric signal using the photoelectric effect. The tracking sensor may track the received optical beam, which may be used to direct the steering mechanism 116 to counteract disturbances due to scintillation and/or platform motion.

The one or more processors 104 may be in communication with the steering mechanism 116 (such as a mirror or a gimbal) for adjusting the pointing direction of the transmitter 112, receiver 114, and/or optical beam. In particular, the steering mechanism 116 may be a MEMS 2-axis mirror, 2-axis voice coil mirror, or piezo electronic 2-axis mirror. The steering mechanism 116 may therefore be configured to steer the transmitter, receiver, and/or optical beam in at least two degrees of freedom, such as, for example, yaw and pitch. The adjustments to the pointing direction may be made to establish acquisition and connection link, such as communication link 22, between the first communication device 102 and the second communication device 122. In addition, the adjustments may optimize transmission of light from the transmitter and/or reception of light at the receiver. In some implementations, the one or more processors 104 may provide closed loop control for the steering mechanism 116 to adjust pointing direction based upon the optical beam received over the communication link from a transmitting communication device, such as an optical beam received over the communication link 22b from the second communication device 122.

Similarly, the second communication device 122 includes one or more processors, 124, a memory 126, a transmitter 132, and a receiver 134. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may be configured to output an optical communication beam carrying an optical communication signal. For example, as shown in FIG. 1B, transmitter 132 of the second communication device 122 may use one or more communication link transmitters 160 to output an optical communication beam in a communication link 22b with the first communication device 102, which receives the optical communication beam. In addition, the transmitter 132 may also be configured to polarize the optical communication beam in varying polarization directions. For this purpose, the transmitter 132 may include a polarization controller 162 as described above with respect to transmitter 112.

Like the receiver 114, the receiver 134 may include a tracking sensor 168 configured to detect the optical beam and an optical fiber 170 with the same or similar features as described above with respect to the receiver 114. In addition, the receiver 134 may also include a diverting component 164, such as a lens, mirror, or other system configured to divert a portion of a received optical beam to the tracking sensor and allow the remaining portion of the received optical beam to couple with the optical fiber 150. The receiver 134 may also include a polarization filter 166 that is positioned between the tracking sensor 168 and the diverting component 164. The polarization filter may be configured to allow light from the optical beam that has one or more polarization directions through the filter and block or reduce all other light from the optical beam having different polarization directions. In particular, the polarization filter may be configured to allow light having a first polarization direction through at full or mostly full amplitude and to reduce the amplitude of light having other polarization directions different from the first polarization direction. The tracking sensor 168 of receiver 134 may track the received optical beam, which may be used to direct the steering mechanism 136 to counteract disturbances due to scintillation and/or platform motion.

Returning to FIG. 1A, the one or more processors 124 may be in communication with the steering mechanism 136 (such as a mirror or a gimbal) for adjusting the pointing direction of the transmitter 132, receiver 134, and/or optical beam, as described above with respect to the steering mechanism 116. The adjustments to the pointing direction may be made to establish acquisition and connection link, such as communication link 22, between the first communication device 102 and the second communication device 122. In addition, the one or more processors 124 may provide closed loop control for the steering mechanism 136 to adjust pointing direction based upon the optical beam received over the communication link from a transmitting communication device, such as an optical beam received over the communication link 22a from the first communication device 102.

The communication links 22a and 22b may be formed between the first communication device 102 and the second communication device 122 when the transmitters and receivers of the first and second communication devices are aligned. Using the communication link 22a, the one or more processors 104 can send communication signals to the second communication device 122. Using the communication link 22b, the one or more processors 124 can send communication signals to the first communication device 102. In some examples, it may be sufficient to establish one communication link 22 between the first and second communication devices 102, 122, which allows for the bi-directional transmission of data between the two devices. The communication links 22 in these examples are FSOC links. In other implementations, one or more of the communication links 22 may be radio-frequency communication links or other type of communication link capable of travelling through free space.

Figure 2:
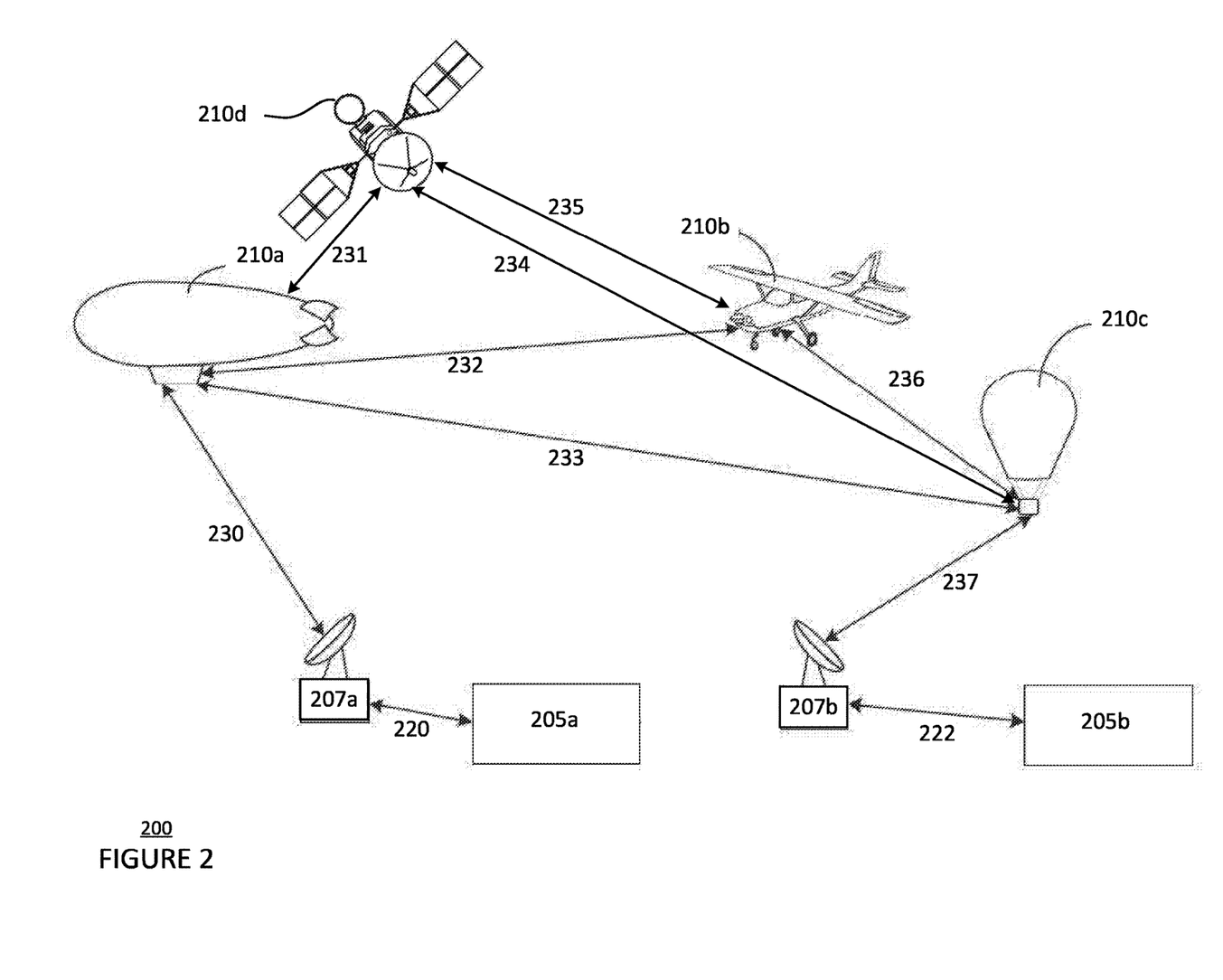
FIG. 2 is a pictorial diagram of a network 200 in accordance with aspects of the disclosure.

As shown in FIG. 2, a plurality of communication devices, such as the first communication device 102 and the second communication device 122, may be configured to form a plurality of communication links between a plurality of communication terminals and form a network 200. For example, the communication terminals in network 200 includes two land-based datacenters 205a and 205b (generally referred to as datacenters 205), two ground terminals, or ground stations, 207a and 207b (generally referred to as ground stations 207), and four airborne high altitude platforms (HAPs) 210a-210d (generally referred to as HAPs 210). As shown, HAP 210a is a blimp, HAP 210b is an airplane, HAP 210c is a balloon, and HAP 210d is a satellite. Arrows shown between a pair of communication terminals represent possible communication links 220, 222, 230-237 between the communication terminals.

The configuration of network 200 as shown in FIG. 2 is illustrative only, and in some implementations the network 200 may include additional or different communication terminals. For example, in some implementations, the network 200 may include additional HAPs, which may be balloons, blimps, airplanes, unmanned aerial vehicles (UAVs), satellites, or any other form of high altitude platform, additional ground communication terminals, or other types of communication terminals. In alternate implementations, the network 200 is a terrestrial network comprising a plurality of communication devices on a plurality of ground communication terminals. The network 200 may be an FSOC network that includes communication terminals having communication devices equipped to perform FSOC, such as the first communication device 102 and the second communication device 122. In other implementations, the network 200 may additionally or alternatively be equipped to perform other forms of communication, such as radiofrequency communications.

In some implementations, the network 200 may serve as an access network for client devices such as cellular phones, laptop computers, desktop computers, wearable devices, or tablet computers. The network 200 also may be connected to a larger network, such as the Internet, and may be configured to provide a client device with access to resources stored on or provided through the larger computer network. In some implementations, HAPs 210 can include wireless transceivers associated with a cellular or other mobile network, such as eNodeB base stations or other wireless access points, such as WiMAX or UMTS access points. Together, HAPs 210 may form all or part of a wireless access network. HAPs 210 may connect to the datacenters 205, for example, via backbone network links or transit networks operated by third parties. The datacenters 205 may include servers hosting applications that are accessed by remote users as well as systems that monitor or control the components of the network 200. HAPs 210 may provide wireless access for the users, and may route user requests to the datacenters 205 and return responses to the users via the backbone network links.

Example Methods

The communication devices may be used to perform a method for tracking a signal source based on polarization modulation of the signal. As described above, one or more communication links 22 may be formed between the first communication device 102 and the second communication device 122 when the first and second communication devices are aligned. Using the transmitter 112 of the first communication device 102, the one or more processors 104 may transmit an optical communication beam carrying an optical communication signal 20 to the receiver 134 of the second communication device 122 over communication link 22a. Using the transmitter 132 of the second communication device 122, the one or more processors 124 may transmit a second optical communication beam carrying a second optical communication signal to the receiver 114 of the first communication device 102 over communication link 22b.

Figure 3:
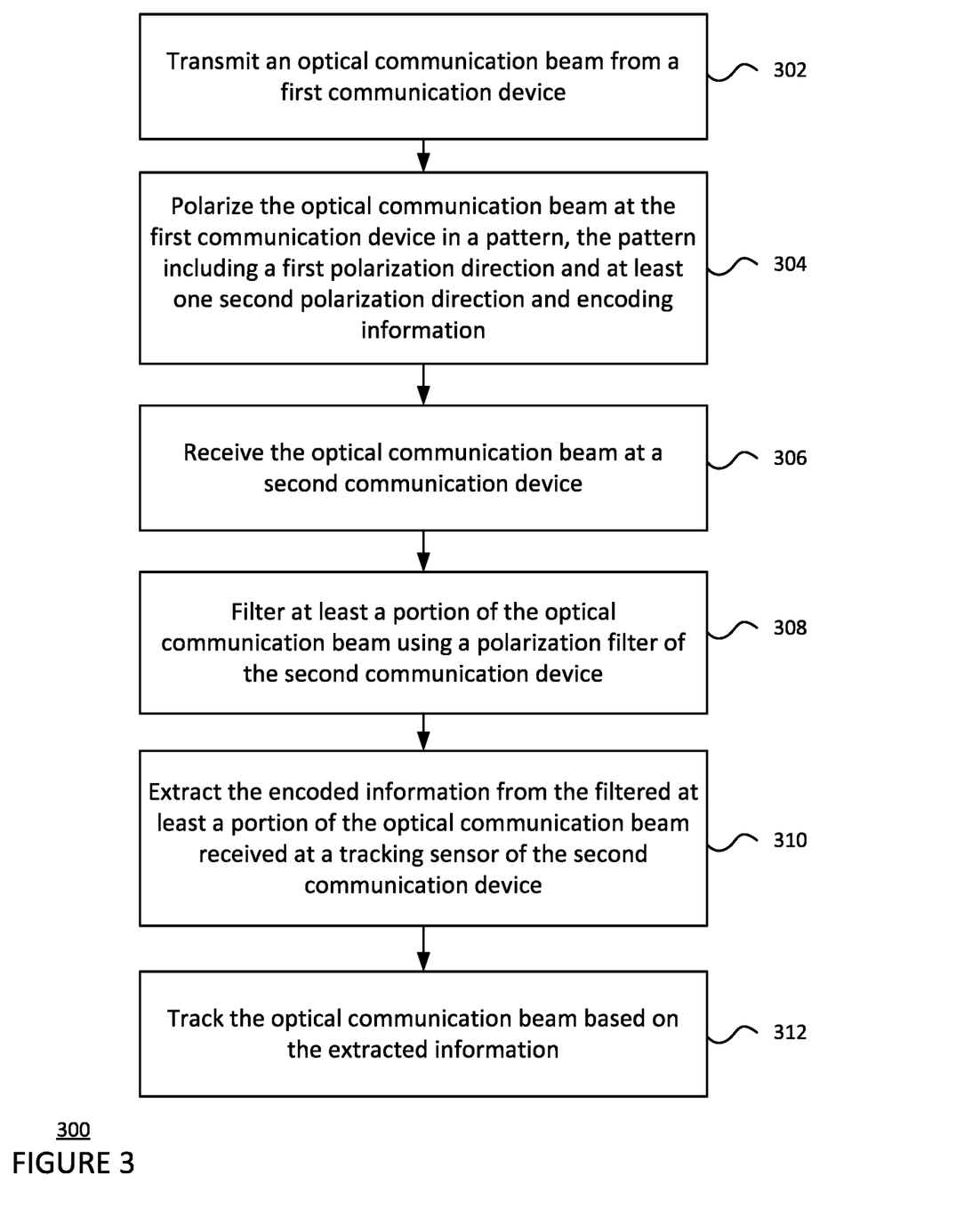
FIG. 3 is a flow diagram 300 in accordance with aspects of the disclosure.

In FIG. 3, flow diagram 300 is shown in accordance with some of the aspects described above that may be performed by the one or more processors 104 of the first communication device 102 and/or the one or more processors 124 of the second communication device 122. While FIG. 3 shows blocks in a particular order, the order may be varied and that multiple operations may be performed simultaneously. Also, operations may be added or omitted.

At block 302, an optical communication beam may be transmitted from a first communication terminal to a second communication terminal. The optical communication beam may carry data in a communication signal, such as client data in an optical communication signal. For example, the first communication device 102 of the first communication terminal may be configured to transmit an optical communication beam, which carries optical communication signal 20, over communication link 22a. The optical communication beam may be transmitted from the one or more communication link transmitters 140.

At block 304, the transmitted optical communication beam may be polarized using a polarization controller, such as polarization controller 142. In some implementations, the polarization direction of the transmitted optical signal may be modulated by the polarization controller 142 over time in order to encode information. Identifier information or other information that would typically be incorporated into a beacon beam may be encoded using the modulation of the polarization direction.

For example, the one or more processors 104 of the first communication device 102 may use the polarization controller 142 to polarize the polarization direction of the optical communication beam in a modulation pattern. For example, the modulation pattern may be a sinusoidal wave pattern between different polarization directions, a binary pattern, or other type of pattern that varies the polarization direction of the optical communication beam between a first polarization direction and at least one other polarization direction. The polarization may be performed using the polarization controller 142 in the transmitter 112 of the first communication device 102.

At block 306, the optical communication beam may then be received at the second communication terminal where a portion of the optical communication beam is diverted towards a tracking sensor of the second communication terminal. The portion of the optical communication beam, such as 10% or more or less of the optical communication beam, may be diverted by a diverting component in the receiver of the second communication terminal. The rest of the received optical communication beam may be directed to an optical fiber. For example, the received 134 of the second communication device 122 of the second communication terminal may receive the optical communication beam transmitted from the first communication device 102. The diverting component 144 of the receiver 134 of the second communication device 122 is configured to divert a portion of the received optical communication beam to the tracking sensor 148 of the second communication device 122. The rest of the received optical communication beam may be directed to the optical fiber 150 of the second communication device 122.

At block 308, the diverted portion of the optical communication beam may be filtered using a polarization filter before it reaches the tracking sensor. As noted above, the polarization filter 146 of the second communication device 122 may be positioned between the tracking sensor 148 and the diverting component 144. The polarization filter 146 may partially or totally block the light of the portion of the optical communication beam that is not polarized in the particular polarization direction, such the first polarization direction. As a result, the amplitude, or optical power level, of the diverted portion of the optical communication beam received at the tracking sensor may vary as the polarization of the optical communication is modulated over time.

At block 310, the diverted portion of the optical communication beam may be received at a tracking sensor of the second communication terminal and processed to extract information. For instance, the diverted portion of the optical communication beam may be received at the tracking sensor 148 of receiver 134. The amplitude, or optical power level, of the optical communication beam over time may be detected at the tracking sensor 134. The pattern of the received amplitudes may be used to identify encoded information. In this example where the polarization filter is configured to filter all but the first polarization direction, the amplitude of the diverted portion of the optical communication beam is highest when the optical communication beam is polarized in the first polarization direction and lowest when the polarized in an opposite polarization direction from the first polarization direction.

The one or more processors 124 of the second communication device 122 may convert the received amplitudes to an electrical signal and process the electrical signal to extract encoded information. The information may be related to the optical communication beam or the transmitting communication terminal, such as the first communication terminal, similar to a traditional beacon signal. The information may include, for example, an optical beam identifier, a source identifier, a source location, signal characteristics, or other identifying information.

At block 312, based on the extracted information, the one or more processors at the second communication terminal, such as the one or more processors 124 of the second communication device 122, may track the received optical communication beam. In some implementations, tracking the received optical communication beam includes determining an updated pointing direction based on the extracted information and moving the steering mechanism, such as steering mechanism 136 of the second communication device 122, to the updated pointing direction. Tracking the optical communication beam may also include scheduling an updated pointing direction at a future point in time based on the extracted information.

In other implementations, tracking the optical communication beam may include identifying the diverted portion of the optical communication beam based on the extracted information and detecting a location of the diverted portion of the optical communication device on the tracking sensor. An alignment of the first communication terminal with the second communication terminal may then be determined based on the identified location. For example, the identified location may be compared with a target location on the tracking sensor, such as tracking sensor 168, where the portion of the optical communication beam falls when the first communication terminal is properly aligned with the second communication terminal. Proper alignment with the second communication terminal may occur when the optical communication beam transmitted by the first communication terminal is received at or near a center of an optical fiber, such as optical fiber 170, in the second communication terminal. Based on the determined alignment, the pointing direction of the second communication terminal may be adjusted to improve the alignment with the first communication terminal. An improved alignment may allow for faster data transfer, reduced latency, etc. Tracking the optical communication beam also may include transmitting updated alignment information from the second communication terminal to the first communication terminal and updating the pointing direction of the first communication terminal.

Additionally or alternatively, the encoded information may include transmission specifications based on the system requirements of the first communication device or other information related to operating or maintaining a communication link, such as communication link 22, between the first and second communication devices. In this case, the one or more processors at the second communication terminal may update the transmitter of the second communication terminal based on the extracted information. For example, the one or more processors 124 of the second communication device 122 may update the transmission specifications of the transmitter 132, such as frequency of a transmitted optical communication beam, based on frequency information extracted from the encoded information.

In an alternative implementation, the first communication terminal may polarize and transmit an optical communication beam to acquire and establish a communication link with the second communication terminal. In this example, there is no existing communication link between the first communication terminal and the second communication terminal. When the second communication terminal receives the polarized optical communication beam, an updated pointing direction may be determined based on information extracted from the polarization modulation and executed as described above. The second communication terminal may optically polarize and transmit a second optical communication beam, from which the first communication terminal may extract information to determine and implement a second updated pointing direction for the first communication terminal. This cycle may be repeated any number of times. One or more communication links, such as communication link 22a or 22b, may then be established once a proper alignment between the first communication terminal and the second communication terminal has been attained. Additional types of updates may be determined and implemented as well, such as transmission specification as described above.

In other implementations, the roles of the first and second communication terminals or devices described above may be reversed.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, by one or more second processors of a first communication device from a second communication device, an optical communication beam that has a plurality of polarization directions, the plurality of polarization directions including a polarization pattern of a first polarization direction and at least one second polarization direction, the optical communication beam including encoded information in the polarization pattern and an optical signal carrying data that is different from the encoded information;
filtering, using a polarization filter for the first polarization direction, at least a portion of the optical communication beam, the filtered at least a portion of the optical communication beam being a filtered optical communication beam;
receiving, at a tracking system of the first communication device, the filtered optical communication beam;
determining, by the one or more second processors, an amplitude pattern of the filtered optical communication beam on the tracking system;
extracting, by the one or more second processors, the encoded information from the optical communication beam based on the determined amplitude pattern; and
tracking, by the one or more second processors, the optical communication beam using on the encoded information.

2. The method of claim 1, wherein the tracking system includes a position sensitive detector.

3. The method of claim 1, further comprising:
identifying, by the one or more second processors, the optical communication beam using the encoded information;
determining, by the one or more second processors, a location of the filtered optical communication beam on the tracking system;

determining, by the one or more second processors, an alignment of the first communication device with the second communication device based on the determined location and a target location of the tracking system; and adjusting, by the one or more second processors, the alignment of the first communication device with the second communication device based a difference between the determined location and a zero location.

4. The method of claim 3, wherein the tracking system includes a flat surface and the location of the filtered optical communication beam is on the flat surface of the tracking system.

5. The method of claim 3, wherein the location of the filtered optical communication beam is identified in the extracted information.

6. The method of claim 1, further comprising establishing a communication link with the second communication device based on the encoded information.

7. The method of claim 1, further comprising:
diverting a portion of the optical communication beam towards the tracking system of the first communication device; and
wherein a remaining portion of the optical communication beam is directed to an optical fiber of the first communication device.

8. The method of claim 7, wherein diverting the portion of the optical communication beam towards the tracking system of the first communication device includes using a lens system of the first communication device.

9. The method of claim 1, wherein filtering the at least a portion of the optical communication beam includes using the polarization filter to partially or totally block the at least a portion of the optical communication beam when the polarization direction of the optical communication beam is one of the at least one second polarization direction.

10. The method of claim 1, wherein extracting the encoded information includes converting received amplitudes of the determined amplitude pattern to an electrical signal and processing the electrical signal to extract the encoded information.

11. The method of claim 1, wherein the extracted information corresponds to a beacon signal from the second communication device.

12. The method of claim 1, wherein the extracted information includes at least one of an optical beam identifier, a source location, or signal characteristics.

13. The method of claim 1, wherein tracking the optical communication beam includes:
determining a pointing direction based on the extracted information; and
moving a steering mechanism of the first communication device according to the determined pointing direction.

14. The method of claim 1, wherein tracking the optical communication beam includes scheduling a pointing direction at a future point in time based on the extracted information.

15. The method of claim 1, wherein tracking the optical communication beam includes:
identifying a diverted portion of the optical communication beam based on the extracted information; and
detecting a location of the diverted portion on a tracking sensor of the first communication device; and
adjusting a pointing direction of the first communication device based on the detected location of the diverted portion.

16. The method of claim 15, further comprising comparing the detected location to a target location on the tracking sensor, and wherein adjusting the pointing direction is further based on the comparison.

17. The method of claim 16, wherein the target location corresponds to a location for the optical communication beam when the first communication device and the second communication device are aligned.

18. The method of claim 16, wherein the target location corresponds to a center of an optical fiber of the first communication device.

19. The method of claim 1, further comprising, updating information related to an optical communication link established between the first communication device and the second communication device using the encoded information.

20. The method of claim 19, wherein updating information related to the optical communication link includes updating transmission specifications for the optical communication link based on the encoded information.

* * * * *